United States Patent
Staples et al.

(10) Patent No.: US 10,387,293 B2
(45) Date of Patent: Aug. 20, 2019

(54) SYSTEMS AND METHODS FOR AUTOMATICALLY PARALLELIZING SEQUENTIAL CODE

(71) Applicant: Securboration, Inc., Melbourne, FL (US)

(72) Inventors: Jacob A. Staples, Hooksett, NH (US); Lee Krause, Indialantic, FL (US); James B. Schneider, Melbourne, FL (US); Adam K. Kavanaugh, Orlando, FL (US)

(73) Assignee: Securboration, Inc., Melbourne, FL (US)

( * ) Notice: Subject to any disclaimer, the term of this patent is extended or adjusted under 35 U.S.C. 154(b) by 0 days.

(21) Appl. No.: 14/048,662

(22) Filed: Oct. 8, 2013

(65) Prior Publication Data

US 2014/0101641 A1    Apr. 10, 2014

Related U.S. Application Data

(60) Provisional application No. 61/711,577, filed on Oct. 9, 2012.

(51) Int. Cl.
*G06F 11/36* (2006.01)
*G06F 8/41* (2018.01)
*G06F 9/455* (2018.01)

(52) U.S. Cl.
CPC .......... *G06F 11/3668* (2013.01); *G06F 8/456* (2013.01); *G06F 9/45516* (2013.01)

(58) Field of Classification Search
CPC ... G06F 11/3668; G06F 8/456; G06F 9/45516
See application file for complete search history.

(56) References Cited

U.S. PATENT DOCUMENTS

| | | | |
|---|---|---|---|
| 5,754,860 A | 5/1998 | McKeeman et al. | |
| 6,223,337 B1 * | 4/2001 | Blume | G06F 8/443 |
| | | | 714/E11.208 |

(Continued)

FOREIGN PATENT DOCUMENTS

| | | | |
|---|---|---|---|
| CA | 2262277 A1 * | 8/2000 | ............... G06F 9/44 |
| WO | 2010064260 | 6/2010 | |

OTHER PUBLICATIONS

John Whaley, "Heuristics for Profile-driven Method-level Speculative Parallelization", Parallel Processing, 2005. ICPP 2005. International Conference on Oslo, Norway Jun. 14-17, 2005, Piscataway, NJ, USA,IEEE, Jun. 14, 2005 (Jun. 14, 2005), pp. 147-156, XPOI0820881, 001: 10.1109/ICPP.2005.44 ISBN: 978-0-7695-2380-4.*

(Continued)

*Primary Examiner* — Wei Y Zhen
*Assistant Examiner* — Amir Soltanzadeh

(57) ABSTRACT

Systems, methods, and apparatus for automatically parallelizing code segments are provided. For example, an environment includes a profiling agent, a parallelization agent, and a verification agent. The profiling agent executes a code segment and generates a profile of the executed code segment. The parallelization agent analyzes the code segment to determine whether a parallelizable portion is present in the code segment. When a parallelizable portion is present, the parallelization agent determines, based on the profile of the executed code segment, whether to parallelize the parallelizable portion of the code segment. If it is determined to parallelize the parallelizable portion of the code segment, the parallelization agent automatically parallelizes the parallelizable portion of the code segment. The verification agent verifies the functionality and/or correctness of the parallelized code segment.

20 Claims, 9 Drawing Sheets

(56) References Cited

U.S. PATENT DOCUMENTS

| | | | | |
|---|---|---|---|---|
| 6,243,863 | B1* | 6/2001 | Kothari | G06F 8/456 717/144 |
| 8,307,337 | B2* | 11/2012 | Chamieh | G06F 9/4428 717/113 |
| 8,370,316 | B2* | 2/2013 | Bensberg | G06F 17/3033 707/696 |
| 2004/0210874 | A1* | 10/2004 | Kageyama et al. | 717/124 |
| 2008/0046791 | A1* | 2/2008 | Bicheno | G06F 11/3688 714/742 |
| 2008/0134150 | A1* | 6/2008 | Wong | G06F 8/456 717/130 |
| 2009/0132999 | A1 | 5/2009 | Reyes | |
| 2009/0172353 | A1* | 7/2009 | Su | G06F 8/456 712/30 |
| 2010/0223213 | A1* | 9/2010 | Su | G06N 99/005 706/12 |
| 2010/0299657 | A1* | 11/2010 | Barua | G06F 8/456 717/136 |
| 2011/0099541 | A1* | 4/2011 | Blomstedt | G06F 8/433 717/136 |
| 2011/0239201 | A1* | 9/2011 | Vaidya et al. | 717/149 |
| 2011/0289519 | A1* | 11/2011 | Frost | G06F 8/456 719/328 |
| 2013/0232476 | A1* | 9/2013 | Varma | G06F 8/443 717/150 |
| 2013/0254754 | A1* | 9/2013 | Rajaraman | G06F 8/456 717/149 |

OTHER PUBLICATIONS

PCT International Search Report and Written opinion in International Application PCT/US2013/063842, dated Mar. 19, 2014, 21 pgs.

* cited by examiner

SYSTEMS AND METHODS FOR AUTOMATICALLY PARALLELIZING SEQUENTIAL CODE

CROSS-REFERENCE TO RELATED APPLICATIONS

This application claims priority to U.S. Provisional Patent Application No. 61/711,577 entitled "Systems and Methods for Automatically Parallelizing Sequential Code," filed Oct. 9, 2012. The above-referenced Provisional patent application is hereby incorporated by reference in its entirety.

GOVERNMENT STATEMENT

This technology was made with government support under Contract Number O11B-T03-1010 awarded by the Air Force Research Laboratory. The government may have certain rights in the technology.

BACKGROUND

As processor clock speed has begun to reach its thermal and power constraint limitations, improving processor performance using mechanisms other than increasing the speed of the processor clock is desirable. Accordingly, programmers have turned to thread level parallelism to improve processing performance. However, programming threads in parallel is a tedious and time-consuming task and may be fraught with errors.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

In one aspect the technology relates to automatic parallelization of code segments. In one embodiment, a method may include executing a code segment to generate a profile of the executed code segment and analyzing the code segment to determine whether a parallelizable portion is present in the code segment. When a parallelizable portion is present in the code segment, the method may further include determining, based on the profile of the executed code segment, whether to parallelize the parallelizable portion of the code segment. When the parallelizable portion is present in the code segment, the method may further include automatically parallelizing the parallelizable portion of the code segment based on the profile of the executed code segment. In one embodiment, the code segment may be a binary code segment. In another embodiment, the code segment may be a method in a code base. In another embodiment, the code segment may be a class in a code base. The parallelizable portion of the code segment may include at least one parallel structure. In one embodiment, the analyzing operation may include analyzing a processor time required to execute the code segment.

In embodiment, a method may include determining, during execution of a first code segment, a first performance characteristic of the first code segment, determining, based on the first performance characteristic, at least one parallelizable portion of the first code segment, and automatically transforming the parallelizable portion of the first code segment into a parallelized code segment. The first performance characteristic may include the processor time for executing the first code segment. In one embodiment, the processor time for executing the first code segment may be based on the number of times the first code segment is executed. In another embodiment, the processor time for executing the first code segment is based on the type of structure of the first code segment. The method may further include determining, during execution of the parallelized code segment, a second performance characteristic of the parallelized code segment, and comparing the first performance characteristic with the second performance characteristic. The second performance characteristic may include the processor time for executing the parallelized code segment. The processor time for executing the parallelized code segment may be based on the number of times the parallelized code segment is executed.

In one embodiment, a method for verifying functionality of a parallelized code segment may include receiving a model of expected behavior of a code segment, automatically generating a first test vector associated with the code segment during execution of the code segment, and automatically generating a second test vector associated with the parallelized code segment during execution of the parallelized code segment. The parallelized code segment may be derived from the code segment. The method may further include comparing the first test vector to the model of expected behavior to obtain a first result, comparing the second test vector to the model of expected behavior to obtain a second result, and comparing the first result and the second result to verify functionality of the parallelized code segment. The model of expected behavior may include observed input/output sets for the code segment. The first test vector may include inputs to the code segment and the code segment return type. The second test vector may include inputs to the parallelized code segment and the parallelized code segment return type. In one embodiment, the method may further include computing an input hash value of the first test vector inputs and an output hash value of the first test vector return type and comparing the input hash value with the model of expected behavior.

In one embodiment, a system may include a processor and a memory. The memory may be for storing instructions which, when executed by the processor, performs a method. The method performed may include executing a code segment to generate a profile of the executed code segment and analyzing the code segment to determine whether a parallelizable portion is present in the code segment. When a parallelizable portion is present in the code segment, the method may further include determining, based on the profile of the executed code segment, whether to parallelize the parallelizable portion of the code segment. When the parallelizable portion is present in the code segment, the method may further include automatically parallelizing the parallelizable portion of the code segment based on the profile of the executed code segment.

In one embodiment, a system may include a processor and a memory. The memory may be for storing instructions which, when executed by the processor, performs a method. The method performed may include determining, during execution of a first code segment, a first performance characteristic of the first code segment, determining, based on the first performance characteristic, at least one parallelizable portion of the first code segment, and automatically transforming the parallelizable portion of the first code segment into a parallelized code segment. The method may further include determining, during execution of the parallelized code segment, a second performance characteristic of the parallelized code segment, and comparing the first performance characteristic with the second performance characteristic.

In one embodiment, a system may include a processor and a memory. The memory may be for storing instructions which, when executed by the processor, performs a method. The method performed may include receiving a model of expected behavior of a code segment, automatically generating a first test vector associated with the code segment during execution of the code segment, and automatically generating a second test vector associated with the parallelized code segment during execution of the parallelized code segment. The parallelized code segment may be derived from the code segment. The method may further include comparing the first test vector to the model of expected behavior to obtain a first result, comparing the second test vector to the model of expected behavior to obtain a second result, and comparing the first result and the second result to verify functionality of the parallelized code segment.

In one embodiment, a method may include analyzing a code segment to determine whether the code segment includes a parallelizable portion. The analyzing operation may be performed at compile time. When it is determined that the code segment includes the parallelizable portion, the method may further include adding at least one transactional marker to the parallelizable portion of the code segment. The method may further include automatically transforming the parallelizable portion of the code segment into a parallel structure.

In one embodiment, a method may include determining, during execution of a first code segment, a first performance characteristic of the first code segment and automatically transforming the parallelizable portion of the first code segment into a parallelized code segment. The method may further include determining, during execution of the parallelized code segment, a second performance characteristic of the parallelized code segment and comparing the first performance characteristic with the second performance characteristic.

In one embodiment, a method may include receiving a model of expected behavior of a code segment, receiving a first test vector associated with the code segment, and automatically generating a second test vector associated with a parallelized code segment during execution of the parallelized code segment. The parallelized code segment may be derived from the code segment. The method may further include comparing the first test vector to the model of expected behavior to obtain a first result, comparing the second test vector to the model of expected behavior to obtain a second result, and comparing the first result and the second result to verify functionality of the parallelized code segment.

In one embodiment, a system may include a processor and a memory. The memory may be for storing instructions which, when executed by the processor, performs a method. The method performed may include analyzing a code segment to determine whether the code segment includes a parallelizable portion. The analyzing operation may be performed at compile time. When it is determined that the code segment includes the parallelizable portion, the method may further include adding at least one transactional marker to the parallelizable portion of the code segment. The method may further include automatically transforming the parallelizable portion of the code segment into a parallel structure.

In one embodiment, a system may include a processor and a memory. The memory may be for storing instructions which, when executed by the processor, performs a method. The method performed may include determining, during execution of a first code segment, a first performance characteristic of the first code segment and automatically transforming the parallelizable portion of the first code segment into a parallelized code segment. The method may further include determining, during execution of the parallelized code segment, a second performance characteristic of the parallelized code segment and comparing the first performance characteristic with the second performance characteristic.

In one embodiment, a system may include a processor and a memory. The memory may be for storing instructions which, when executed by the processor, performs a method. The method performed may include receiving a model of expected behavior of a code segment, receiving a first test vector associated with the code segment, and automatically generating a second test vector associated with a parallelized code segment during execution of the parallelized code segment. The parallelized code segment may be derived from the code segment. The method may further include comparing the first test vector to the model of expected behavior to obtain a first result, comparing the second test vector to the model of expected behavior to obtain a second result, and comparing the first result and the second result to verify functionality of the parallelized code segment.

These and other features and advantages, which character the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWINGS

Non-limiting and non-exhaustive embodiments are described with reference to the following Figures in which.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The present disclosure generally relates to automatic parallelization of code segments. Existing techniques for automatic parallelization of certain code are typically not entirely automated, require access to the original source code that is to be parallelized, and/or use traditional locking techniques requiring a precise vectorization to be constructed at compile time. Accordingly, embodiments described herein include a system for automatic parallelization of code segments. In turn, the performance of software, executable code, and/or binary executable is optimized and the correctness of the automatic parallelization is ensured and/or verified (e.g., verifying that the original binary code functionality has not been broken).

Figure 1:
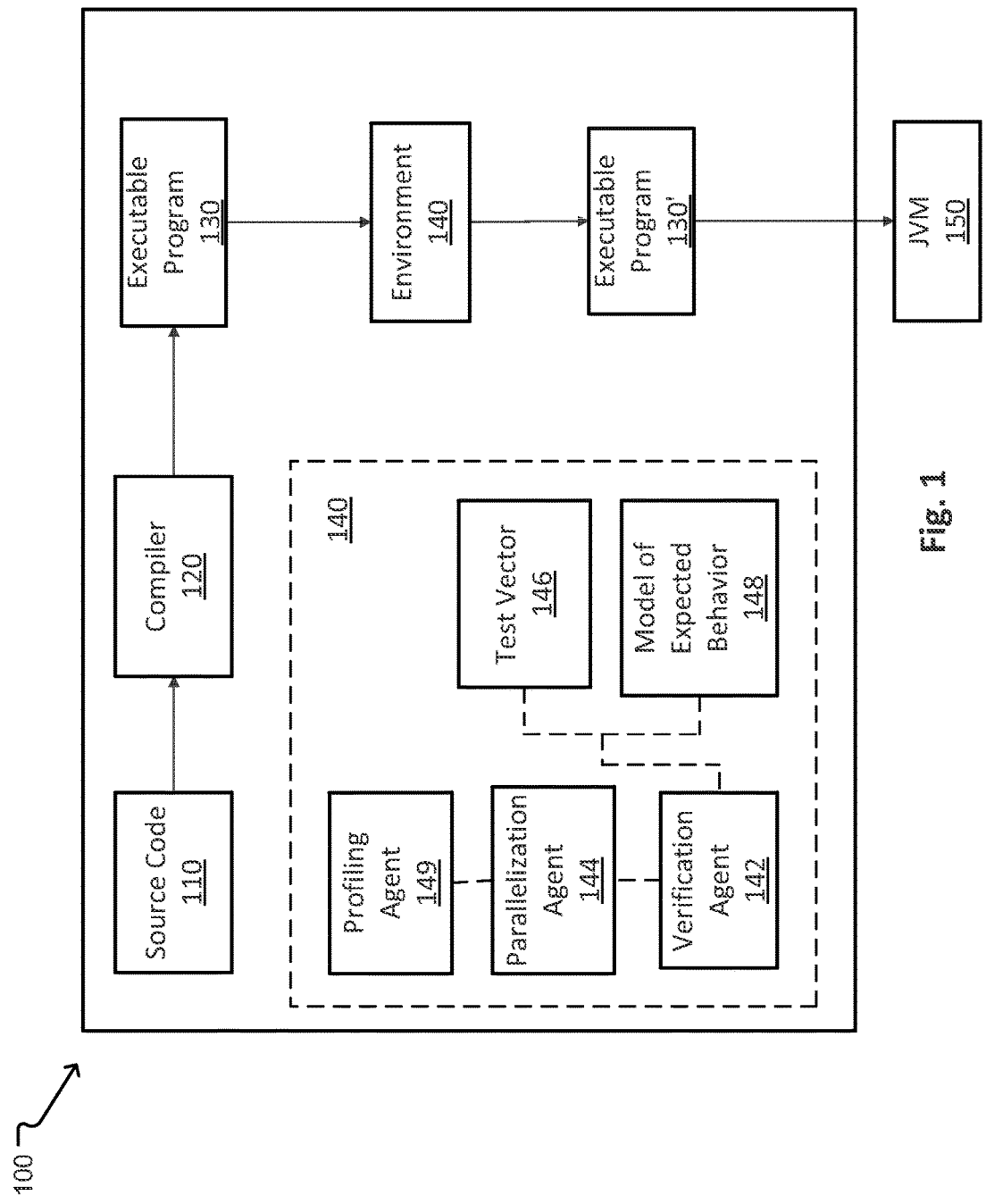
FIG. 1 is a block diagram illustrating an operating environment for automatically parallelizing a code segment according to an embodiment of the present disclosure.

FIG. 1 illustrates an operating environment 100 for automatically parallelizing code according to one or more embodiments. In embodiments, the operating environment 100 may be a static operating environment. As shown in FIG. 1, the operating environment 100 may include source code 110, a compiler 120, an executable program 130, an environment 140, an executable program 130', and a Java virtual machine (JVM) 150. The environment 140 may include a verification agent 142, a parallelization agent 144, and a profiling agent 149. In some embodiments, the verification agent 142 may utilize and/or include at least once test vector 146 and at least one model of expected behavior 148. The operating environment 100 may include a configuration in which one or more of the present embodiments may be implemented during compilation of the source code 110 or after compilation of the source code 110 and before the executable program 130 is executed (e.g., before the runtime of the executable program 130).

In one embodiment, the source code 110 may be high-level source code written in a programming language that is targeted by the JVM 150, such as Java, JRuby, Jython, and Groovy, for example. In some embodiments, the source code 110 may be any high-level programming language such as Java Script, C, C++, Python, etc. The source code 110 may include at least one or more classes, functions, methods, objects, threads, loops, etc. and may be written in a sequential manner (e.g., each instruction is executed one after the other). The compiler 120 includes at least one computer program for transforming the source code 110 into another computer language such as byte code and/or object code to create an executable program (e.g., executable program 130). As such, the compiler 120 may receive source code 110 and include instructions for transforming the source code 110 into the executable program 130. Before the executable program 130 is sent to the JVM 150 to be executed, the executable program 130 may be processed by the environment 140.

As mentioned above, the environment 140 may include various components for processing the executable program 130. A first component may include the profiling agent 149. The profiling agent 149 may be configured to instrument the code of the executable program 130 ("code") to facilitate hot spot analysis. For example, the profiling agent 149 analyzes executions of a code segment to track how long methods take to execute. A code segment may include sequential code, such as, for example, code including instructions that are executed one after the other. Additionally, the profiling agent 149 may be configured to identify portions of code which would benefit most from parallelization. As such, the profiling agent 149 may determine which methods in a code segment are taking the most processor time during execution. In other examples, the profiling agent 149 may be configured to determine which classes (e.g., the classes in which the methods are found) are taking the most processor time and which threads (e.g., the threads in which the methods are found) are taking the most processor time. In this regard, the profiling agent 149 may produce an execution profile. The execution profile may include statistics regarding processor times during execution of methods, classes, and/or threads, for example.

In certain embodiments, the environment 140 may include a parallelization agent 144. The parallelization agent 144 may be configured to analyze a code segment such that parallelizable structures are identified. Additionally, the parallelization agent 144 may be configured to transform the portions of the code segment that are found to be parallelizable into parallelized code. As such, the parallelization agent 144 may receive the set of executable programs 130 and/or the execution profile from the profiling agent 149. In the analysis state, the parallelization agent 144 generally analyzes a read-modify-write sequence of instructions for a local variable of a portion of the code (e.g., sequential loop iterations such as for( ), while( ) and do while( ) loops) and determines whether the sequence contains a modification operation that is reducible. In embodiments, a reducible operation is an operation which is fully commutative, i.e., the order of operand placement does not affect the result of the operation. If the modification operation is reducible, the sequence/segment of code contains a parallelizable structure.

When a code segment is determined to be parallelizable, one or more embodiments provide that the parallelization agent 144 determines whether it is beneficial to parallelize the parallelizable portion of the code segment. For example, the parallelization agent 144 may analyze the execution profile and compare it against the parallelizable portion of the code segment (or code segments) to determine whether it is beneficial to parallelize the parallelizable portion of the code segment. For example, a code segment found to be parallelizable would subsequently be parallelized if the gain in processing time is above a predetermined threshold. In certain embodiments, the predetermined threshold may be based on the type of structure that is parallelizable. In another embodiment, the predetermined threshold may be based on the number of times the code segment is called during execution of the program.

If it is determined that it is beneficial to parallelize the parallelizable portion of the code segment, the parallelizable portion of the code segments may be transformed. In the transformation state, the parallelization agent 144 may produce a transformed code segment (e.g., a method) which is able to run on one or more threads concurrently. This process may include modifying the original executable program 130 containing the method/code segment to be parallelized/transformed and creating a new parallelized executable program 130'. The new parallelized executable program 130' will have the same functionality of the original method's sequential loop iterations while running more efficiently.

In certain embodiments, the verification agent 142 may include optimization and verification functionality. An optimization component (not shown) is configured to determine whether the parallelized code is partitioned near-optimally for the underlying hardware architecture. For example, the optimization component may receive a set of the parallelized executable programs 130' and the execution profile produced by the profiling agent 149. The optimization component may generate a set of re-instrumented executable programs derived from the set of the parallelized executable programs 130' and the execution profile. The re-instrumented executable programs may be partitioned such that the work distribution between a number of threads is near optimal for the underlying hardware architecture.

A verification component (not shown) may verify that the parallel transformation did not introduce any errors into the original code. For example, the verification component may receive a set of near optimally parallelized executable programs produced by the optimization component, a set of test vectors 146 and a model of expected behavior 148. The test vectors 146 and the model of expected behavior 148 may be provided by a programmer, administrator or other user. The test vectors 146 may include inputs to the method being verified ("test vector inputs") and the method return type ("test vector output"). The model of expected behavior 148 may include all observed input/output sets for the method being verified during its execution over a number of invocations. In certain embodiments, the number of invocations may be predetermined by the programmer, administrator etc. In another embodiment, the number of invocations may be determined by the system, the type of code segment that was parallelized, or the number of time the parallelized code segment is executed. As such, the verification component may compute an input hash value of the test vector inputs and an output hash value of the test vector output and then invoke a verification method whose arguments are the input hash value and the output hash value.

In certain embodiments, the verification method may compare an input hash value with the model of expected behavior 148 to find a match between the input hash value and the observed input sets of the model of expected behavior 148. If no match is found (e.g., the test vector inputs have never been executed by the method), a new observed input/output set of the model of expected behavior 148 may be created for this input/output hash pair. If a match is found, the verification method may compare the output hash with the model of expected behavior 148 to verify the output hash matches the observed output from the model of expected behavior 148. If the output hash matches the observed output from the model of expected behavior 148, verification succeeds. If the output hash does not match the observed output from the model of expected behavior 148, verification fails. If verification succeeds, the parallelized executable programs 130' may be assumed to be correctly transformed. If a verification failure occurs during execution, the parallelized executable programs 130' may be assumed to be incorrectly transformed.

In another embodiment, the environment 140 may be executed during compilation of the source code 110. For example, during compilation, the environment 140 may transform sequential loop iterations into parallel loop iterations, as described above with reference to the environment 140 processing at least one executable program 130.

The operating environment 100 may include some form of a central processing unit (CPU) (e.g., one or more processors disposed in any appropriate processing architecture). For example, the environment 140 may include instructions of a computer program, for example, for performing arithmetical, logical, and/or input/output operations of the operating environment 100. For example, when the executable program 130 is received by the environment 140 after the source code 110 is received by the compiler 120 and compiled into the executable program 130, the various components of the environment 140 may include instructions to process the executable program 130 such that it is determined whether the executable program 130 is parallelizable, whether it is beneficial to parallelize the parallelizable portion of the executable program 130, instructions for parallelizing the parallelizable portion of the executable program 130, and instructions for verifying the correctness of parallelizing the parallelizable portion of the executable program 130.

Figure 2:
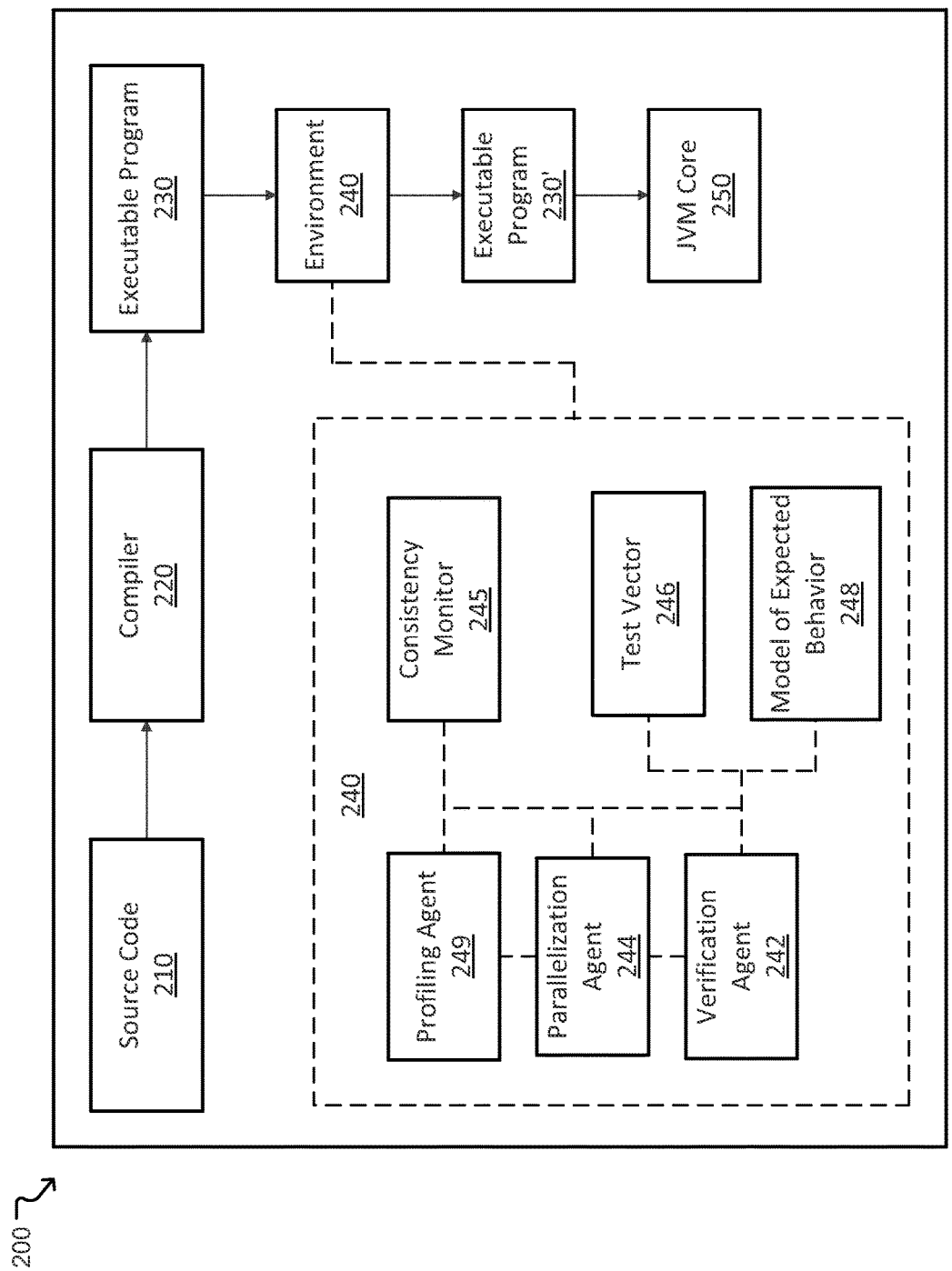
FIG. 2 is a block diagram illustrating an operating environment for automatically parallelizing a code segment according to an embodiment of the present disclosure.

FIG. 2 illustrates an operating environment 200 for automatically parallelizing code according to one or more embodiments. In embodiments, the operating environment 200 may be a dynamic operating environment. The operating environment 200 may be implemented via a JVM (e.g., such as the JVM 150 described above relative to FIG. 1). As shown in FIG. 2, the operating environment 200 may include source code 210, a compiler 220, an executable program 230, an environment 240, an executable program 230, and a JVM core 250. The environment 240 may include a verification agent 242, a parallelization agent 244, and a profiling agent 249. In some embodiments, the verification agent 242 may utilize and/or include at least once test vector 246 and at least one model of expected behavior 248. The operating environment 200 may include a configuration in which one or more of the present embodiments may be implemented during execution/runtime of the executable program 230. In one example, a configuration may include the capability of implementing operating environment 200 via the JVM such that operating environment 200 may be turned on and off, for example, based on resource needs. The source code 210, compiler 220, executable program 230, environment 240, and executable program 230 may be configured similar to the source code 110, a compiler 120, an executable program 130, environment 140, and executable program 130' described above relative to FIG. 1. In this regard, the operating environment 200 may include all the functionality described in the above embodiments relative to the operating environment 100 of FIG. 1.

As such, in the operating environment 200, while the executable program 230 is executed, the environment 240 may determine whether the executable program 230 is parallelizable and whether it is beneficial to parallelize the parallelizable portion of the executable program 230. If it is determined to be beneficial to parallelize the parallelizable portion of the executable program 230, the environment 240 may parallelize the parallelizable portion of the executable program 230 and verify the correctness of parallelized portion of the executable program 230.

For example, similar to the parallelization agent 144 described above with reference to the static operating environment 100 of FIG. 1, the parallelization agent 244 may be configured to analyze the code such that parallelizable structures are identified and to transform the portions of the code found to be parallelizable into parallel code. In this regard, the parallelization agent 244 may process the executable program 230, as it is executed, first by identifying one or more sequential loop iterations in one or more methods of the executable program 230. After one or more sequential loop iterations are identified, a pre-transformation stage may be performed on instructions of the loop iterations that obscure data dependencies. An instruction that may obscure data dependencies may include an instruction that increments a local variable by a fixed amount. In this regard, the pre-transformation stage may include converting those instructions that obscure data dependencies into a primitive read, modify, write instruction sequence such that when dependency analysis is performed, it is easier to identify that a local variable is being read and subsequently written.

After the pre-transformation stage is performed, a loop pre-analysis stage may be performed. The loop pre-analysis stage may determine whether assumptions about the nature of the identified sequential loop iterations hold. For example, one assumption may include that a loop iteration condition test is dependent upon a single numeric value that gets updated once at the end of the loop. Another assumption may include that the loop index initial and limit values are known just before the loop begins and that neither of these values nor the loop index are modified in the loop body. As such, the sequential loop iterations may be analyzed by the parallelization agent 244 using such assumptions.

Another stage of the analysis performed by the parallelization agent 244 may include a dependency analysis stage. The dependency analysis stage may determine the mapping of individual instructions to other instructions. This may include determining which instructions correspond to reads and writes to one or more variables, either local variables or global variables. As such, an atomic guard analysis may be created. The atomic guard analysis may include leaving local variables declared inside the loop alone (e.g., each thread may create an independent copy), converting local variables declared outside the loop and which are read only to fields accessible by each thread executing loop iterations, and converting local variables declared outside the loop which are subsequently written inside the loop to fields accessible by each thread executing loop iterations.

After performing dependency analysis, a loop post analysis stage may be performed to determine whether the loop is parallelizable or inherently sequential. For example, a read-modify-write sequence of instructions for a local variable may be analyzed. As an example, in the statement x=x+i, there are two read-modify-write chains. The first includes a read to x, the mathematical operator +, and a write to i. The second may include a read to i, to mathematical operator +, and a write to x. Next, the terminal node of these read-modify-write chains may be analyzed. If the terminal node is a local variable declared outside the loop which is subsequently written inside the loop (as discussed above), the chains terminating in that variable may be analyzed to determine whether each is reducible. If any such chain contains a modification operation that is not reducible, it is determined that the loop is not parallelizable. As discussed above, a reducible operation is one which is fully commutative. Some examples of reducible operations may include addition, multiplication, binary and logical OR, binary and logical XOR, and binary and logical AND.

A final check may be performed after it is determined that a portion of the code can be parallelized. One check may include determining if the method contains any dependency-obscuring instruction after the loop pre-transformation stage. If the method does contain any dependency-obscuring instruction after the pre-transformation stage, then it is determined that something may have failed during analysis and a breaker may be thrown. Additionally, before the parallizable portions of the code are transformed, a preliminary class loader verification test may be performed to ensure that the initial transformations performed do not prevent the code from being successfully loaded by a Java classloader.

As discussed above, the parallelization agent 244 may be configured to transform the portions of the code found to be parallelizable into parallel code. Before the portions of the code found to be parallelizable are transformed into parallel code and after it is determined that the code is parallelizable, it is determined whether it is beneficial to transform/parallelize the parallelizable code. As discussed above, the parallelization agent 244 may receive an execution profile from the profiling agent 249, analyze the execution profile and compare it against the parallelizable portion of the code segment (or code segments) to determine whether it is beneficial to parallelize the parallelizable portion of the code segment. If it is determined that it is beneficial to parallelize the parallelizable portion of the code segment, the parallelization agent 244 may proceed with transforming the parallelizable portion of the code segment. In one embodiment, it may be determined that it is beneficial to parallelize the parallelizable portion of the code segment if the code segment is called a minimum number of times during execution of the program. In other embodiments, it may be determined that it is beneficial to parallelize the parallelizable portion of the code segment if the processor speed/resources meet a predetermined threshold (e.g., if the gain in processing time is above a predetermined threshold).

As discussed above, transforming the parallelizable code may include modifying the original class containing the method to be parallelized and creating a new parallelized class which implements a runnable interface. This interface may include the new functionality of the original method's loop(s) in its run method. Modifying the original class may include adding a field to the class, adding a method to the class, copying and/or pasting code from one method into another method, modifying and/or adding one or more instructions in a method, and accessing a field rather than a local variable.

In one or more embodiments, when adding a field, the access specifier of the field (e.g., public, static, final) as well as its type (e.g., java/lang/Integer, java/lang/Double) and name should be provided. When adding a method to a class, the method's formal argument list and name should be provided. Subsequently, any instructions containing the functionality of the method should be added. Cutting and pasting code from one method into another method may include remapping all labels in the original method containing the code being cut to new labels in the method in which the code is being pasted. As such, each instruction may be virtually duplicated and pasted into the new method and the original method instruction can be deleted.

For example, the parallelization agent 244 may perform a technique which reduces the number of transactions required in the parallelized code segment using temporary variables. In the example code segment to be parallelized, as illustrated below, various iterations of the outer loop will occur simultaneously in independent threads after parallelization. This means that each update to in CircleCount and in SquareCount will occur within its own transaction. Because these updates occur within an inner loop, a large number of transactions will be generated. As such, a speedup from parallelization may be achieved, but it may not be optimized.

```
for (double x = XSTART; x < XSTOP; x+=DELTA)
{
    for (double y = YSTART; y < YSTOP; y+=DELTA)
    {
        double rSquared = x*x + y*y;
        if (rSquared < RADIUS_SQUARED)
        {
            inCircleCount++; //var declared outside of loop scope
        }
        inSquareCount++; //var declared outside of loop scope
    }
}
```

In the example code segment to be parallelized, as illustrated below, the technique which reduces the number of transactions required in the parallelized code segment has been performed by the parallelization agent 244.

```
for (double x = XSTART; x < XSTOP; x+=DELTA)
{
    long tempInCircleCount = 01;
    long tempInSquareCount = 01;
    for (double y = YSTART; y < YSTOP; y+=DELTA)
    {
        double rSquared = x*x + y*y;
        if (rSquared < RADIUS_SQUARED)
        {
            tempInCircleCount++;
        }
        tempInSquareCount++;
    }
    inCircleCount += tempInCircleCount;
    inSquareCount += tempInSquareCount;
}
```

This transformed loop achieves a speedup of approximately 6 times that of the previously illustrated loop. The technique performed by the parallelization agent 244 may include storing the count values in temporary variables which are loop local and updating them once per outer loop iteration (rather than inner loop iteration). In turn, a reduction in the number of transactions is created. The technique performed by the parallelization agent 244 may include identifying inner loops and determining which transaction-guarded variables updated in the inner loops are able to be modified to operate using temporary, thread-local variables. The technique performed by the parallelization agent 244 may further include transforming the instructions in the loop such that the inner loop operates on these temporary variables.

As discussed above, the verification agent 242 may include optimization and verification functionality. An optimization component may ensure that the parallel code is partitioned near-optimally for the underlying hardware architecture. For example, the optimization component may receive a set of the parallelized executable programs 230' and the execution profile produced by the profiling agent 249. The optimization component may generate a set of re-instrumented executable programs derived from the set of the parallelized executable programs 230' and the execution profile. The re-instrumented executable programs may be partitioned such that the work distribution between a number of threads is near optimal for the underlying hardware architecture.

In certain embodiments, a verification component may analyze the parallelized code segment to determine whether the parallel transformation introduced any errors into the original code segment. Similar to the verification component described above in relation to the operating environment 100, the verification component of the environment 240 may receive a set of optimal or near optimally parallelized executable programs produced by the optimization component, a set of test vectors 246 and a model of expected behavior 248.

In certain embodiments, the model of expected behavior 248 in the operating environment 200 may be provided by a programmer, administrator and the like while the test vectors 246 may be generated by a component of the system 200 such as, for example, the verification agent 242. As such, unlike traditional unit testing, the verification component of the verification agent 242 may generate test cases automatically at run time.

As discussed above, the test vectors 246 may include the inputs to the method being verified ("test vector inputs") and the method return type ("test vector output"). The model of expected behavior 248 may include all observed input/output sets for the method being verified during its execution over several thousand invocations. As such, the verification component may compute an input hash value of the test vector inputs and an output hash value of the test vector output and then invoke a verification method whose arguments are the input hash value and the output hash value.

The verification method may be executed as described above relative to the test vectors 146 and model of expected behavior 148 of FIG. 1. In some embodiments, the operating environment 200 may include functionality in addition to that described above relative to the static operating environment 100 of FIG. 1. For example, the environment 240 may include a consistency monitor 245. The consistency monitor 245 may create a set of test vectors 246 and may trigger the verification component of the verification agent 242 for verifying that the parallel transformation did not introduce any errors into the original code. Further, the verification process may be unsuitable for deployment in a production system. As such, the verification process may include first instrumenting a set of binaries (e.g., executable programs 230) to be parallelized and allowing the system to run in a controlled context simulating real-world use. In such a scenario, models of expected behavior 248 may be automatically generated.

As can be appreciated, the operating environment 200 may include advantages such as data independence. For example, if speedups are observed by the profiling agent 249 with large workloads, the parallelization agent 244 may not trigger a transformation of the code if only small workloads are observed in reality. As such, some embodiments provide that parallelization is only used in the operating environment 200 when it provides a noticeable benefit. In one embodiment, the parallelization agent 244 may interface with a graphical user interface to allow manual control of the transformation process. This control may include which code segments should be parallelized, when the segments should be parallelized etc. For example, the graphical user interface may display a hierarchy of classes and class methods contained in a directory in addition to the parallelization status of each method. A user, for example, may browse this hierarchy and select individual methods to parallelize. When parallelizing a method, the user may be prompted for the number of threads the method should be run with. The number of threads used by the method may be determined automatically by the optimization framework.

Figure 3:
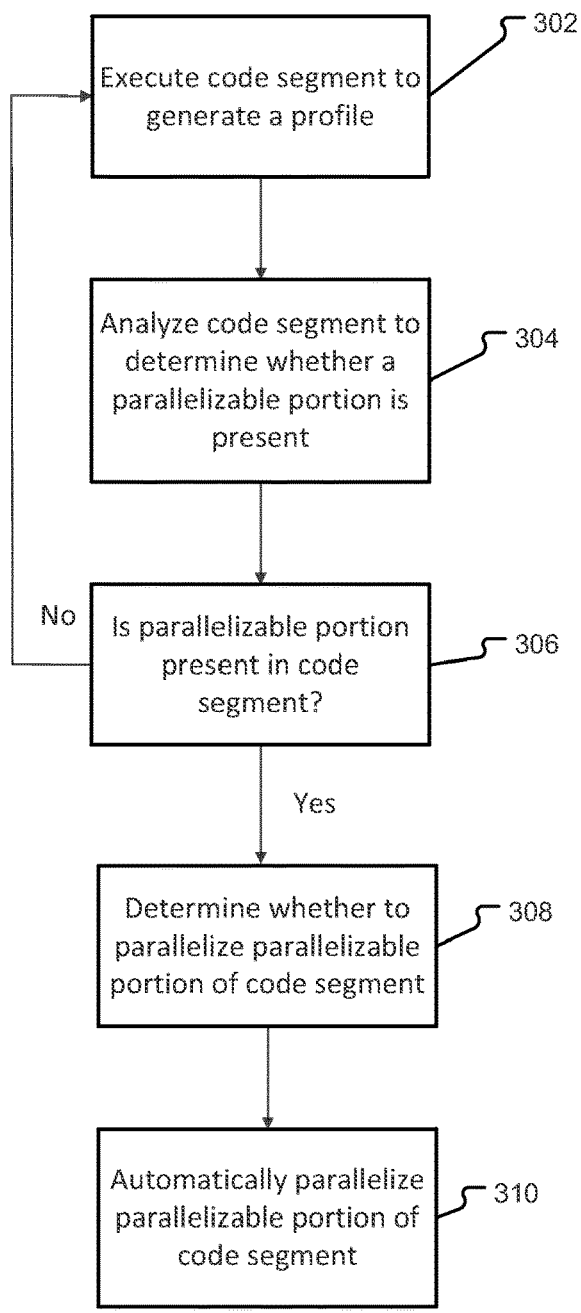
FIG. 3 is a flow diagram illustrating operations for determining whether a code segment should be parallelized according to a first embodiment of the present disclosure.

FIG. 3 illustrates a method 300 for determining whether a code segment should be parallelized according to one or more embodiments of the present disclosure. Method 300 begins at operation 302 in which a code segment is executed to generate a profile. For example, source code may be received at a compiler and the compiler may create an executable file from the source code. The executable file may be executed such that it invokes a method in the profiling agent that determines which methods in the executable file are taking the most processor time. In turn, the profiling agent may generate a profile of the executed code segment. As such, the profile of the executed code segment may include statistics regarding processor times during execution of the code segment. The code segment may be one of a binary code segment, a method in a code base, or a class in a code base.

Method 300 continues to operation 304 in which the code segment is analyzed to determine whether a parallelizable portion is present in the code segment. For example, the parallelization agent may receive the code segment and the profile of the executed code segment from the profiling agent. When the code segment and the profile of the executed code segment are received at the parallelization agent, the parallelization agent may analyze a read-modify-write sequence of instructions for a local variable of a portion of the code segment (e.g., sequential loop iterations such as for( ), while( ) and do while( ) loops) and determine whether the sequence contains a modification operation that is reducible. If the modification operation is reducible, the code segment is a parallelizable structure.

At operation 306, when a parallelizable portion is present in the code segment, flow proceeds to operation 308 where it is determined, based on the profile of the executed code segment, whether to parallelize the parallelizable portion of the code segment. For example, the parallelization agent may analyze the profile of the executed code segment and compare it against the parallelizable portion of the code segment to determine whether it is beneficial to parallelize the parallelizable portion of the code segment. In certain embodiments, the determination may be based on how much processor time the parallelizable portion of the code segment took to execute. In other embodiments, the determination may be based on the number of times the parallelizable portion of the code segment is called during execution of the program.

At operation 306, when a parallelizable portion is not present in the code segment, the code segment is not parallelized, and flow proceeds back to operation 302. When it is determined that a parallelizable portion is present in the code segment and it is determined that the code segment is to be parallelized, flow proceeds to operation 310 where the parallelizable portion of the code segment is automatically parallelized (e.g., transformed) based on the profile of the executed code segment. Automatically parallelizing the parallelizable portion of the code segment may include modifying the original code segment to be parallelized/transformed and creating a new parallelized code segment. The new parallelized code segment may contain the functionality of the original code segment's sequential loop iterations.

Figure 4:
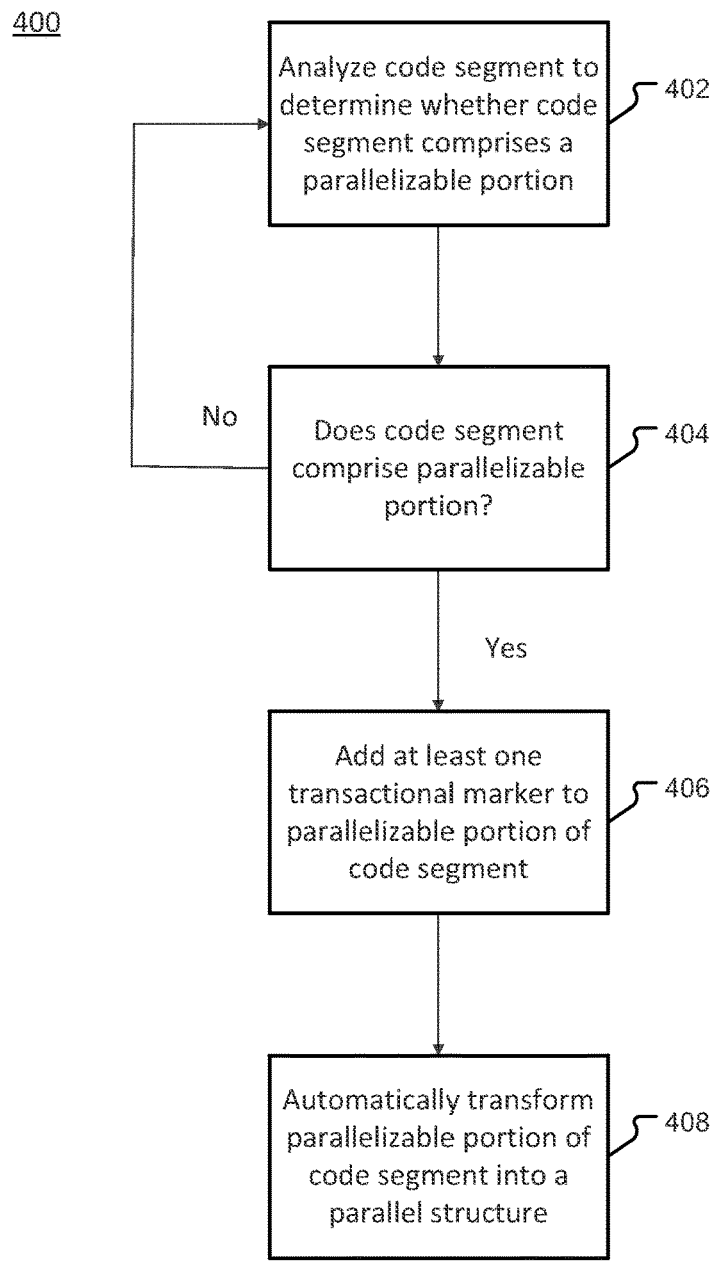
FIG. 4 is a flow diagram illustrating operations for determining whether a code segment should be parallelized according to a second embodiment of the present disclosure.

FIG. 4 illustrates a method 400 for determining whether a code segment should be parallelized according to one or more embodiments of the present disclosure. In one embodiment, a method 400 begins at operation 402 in which the code segment is analyzed, at compile time, to determine whether a parallelizable portion is present in the code segment. For example, the parallelization agent may receive the code segment and may analyze a read-modify-write sequence of instructions for a local variable of a portion of the code segment (e.g., sequential loop iterations such as for( ), while( ) and do while( ) loops) and determine whether the sequence contains a modification operation that is reducible. If the modification operation is reducible, the code segment is identified as a parallelizable structure.

At operation 404, when it is determined that a parallelizable portion is present in the code segment, flow proceeds to operation 406 where at least one transactional marker is added to the parallelizable portion of the code segment. The transactional marker may at least partially control access to memory. For example, the transactional marker may enforce a transactional memory contract for concurrent data accesses to shared data. The transactional marker may be implemented with either software or hardware (JVM) support for transactional memory. At operation 404, when a parallelizable portion is not present in the code segment, the code segment is not parallelized, and flow proceeds back to operation 402.

After operation 406, flow proceeds to operation 408 where the parallelizable portion of the code segment is automatically transformed into a parallel structure. Automatically parallelizing the parallelizable portion of the code segment may include modifying the original code segment to be parallelized/transformed and creating a new parallelized code segment. The new parallelized code segment may contain the functionality of the original code segment's sequential loop iterations.

Figure 5:
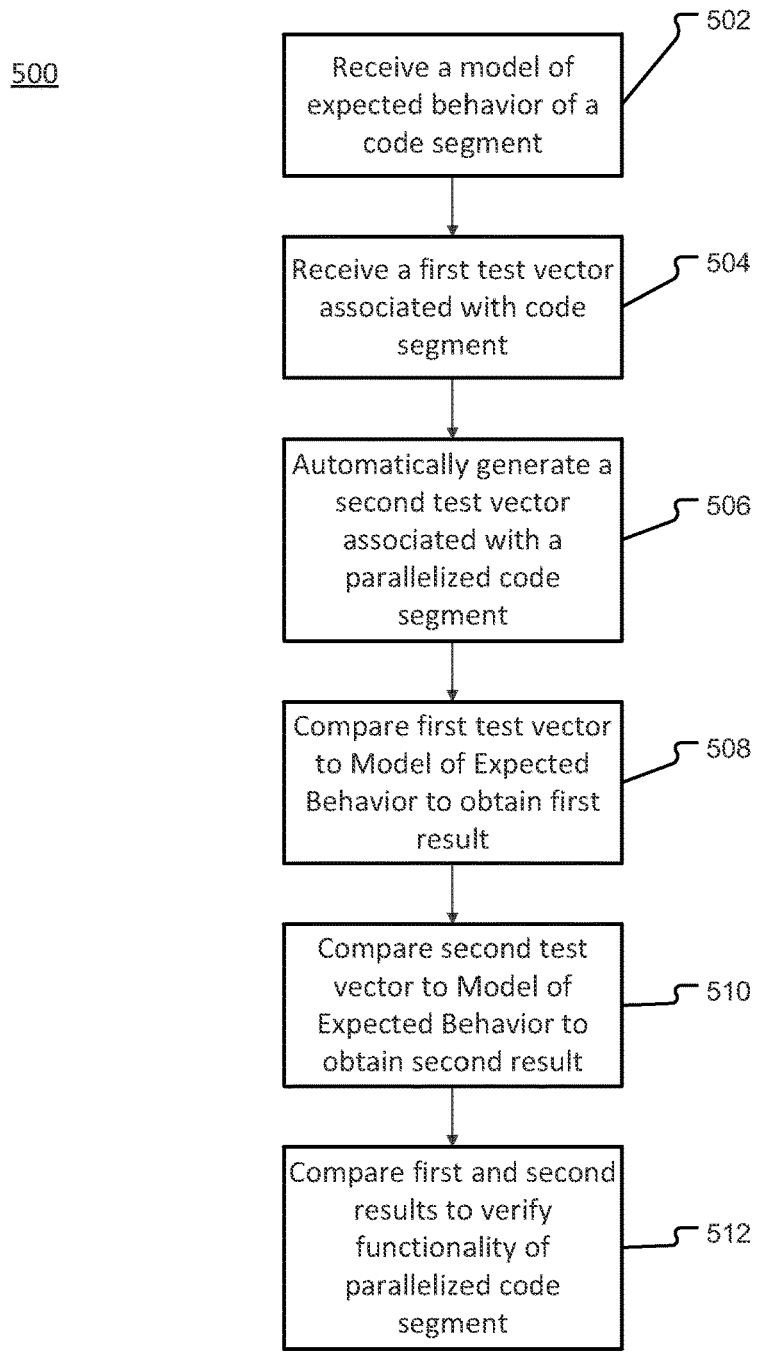
FIG. 5 is a flow diagram illustrating operations for verifying the functionality of a parallelized code segment according to a first embodiment of the present disclosure.

FIG. 5 illustrates a method 500 of verifying functionality of a parallelized code segment according to one or more embodiments of the present disclosure. In one embodiment, a method 500 begins at operation 502 in which a model of expected behavior of a code segment is received by the verification agent. For example, the model of expected behavior may be provided to the verification agent by a programmer, administrator, and the like. The model of expected behavior may include all observed input/output sets for the code segment being verified during its execution over several thousand invocations.

After operation 502, flow proceeds to operation 504 where a first test vector associated with the code segment is received. For example, the first test vector may be provided to a verification agent by a programmer or other user. The first test vector may include the inputs to the code segment being verified and the code segment return type.

After operation 504, flow proceeds to operation 506 where a second test vector associated with a parallelized code segment is automatically generated during execution of the parallelized code segment. The second test vector may be created by the verification agent for the parallelized code segment and may include the inputs to the parallelized code segment and the parallelized code segment return type. The parallelized code segment may be derived from the first code segment. For example, when it is determined to parallelize the first code segment, as discussed above in relation to FIG. 3, the first code segment may be parallelized.

After the second test vector is automatically generated during execution of the parallelized code segment, flow proceeds to operation 508 where the first test vector is compared to the model of expected behavior to obtain a first result. For example, the verification agent may compute an input hash value of the first test vector inputs and an output hash value of the first test vector output and compare the input hash value with the model of expected behavior to find a match between the input hash value and observed input sets of the model of expected behavior. The verification agent may then compare the output hash with the model of expected behavior to obtain a first result.

After the first test vector is compared to the model of expected behavior to obtain a first result, flow proceeds to operation 510 where the second test vector is compared to the model of expected behavior to obtain a second result. For example, the verification agent may compute an input hash value of the second test vector inputs and an output hash value of the second test vector output and compare the input hash value with the model of expected behavior to find a match between the input hash value and observed input sets of the model of expected behavior. The verification agent may then compare the output hash with the model of expected behavior to obtain a second result. Flow then proceeds to operation 512 where the first result and second result are compared to verify functionality of the parallelized code segment.

Figure 6:
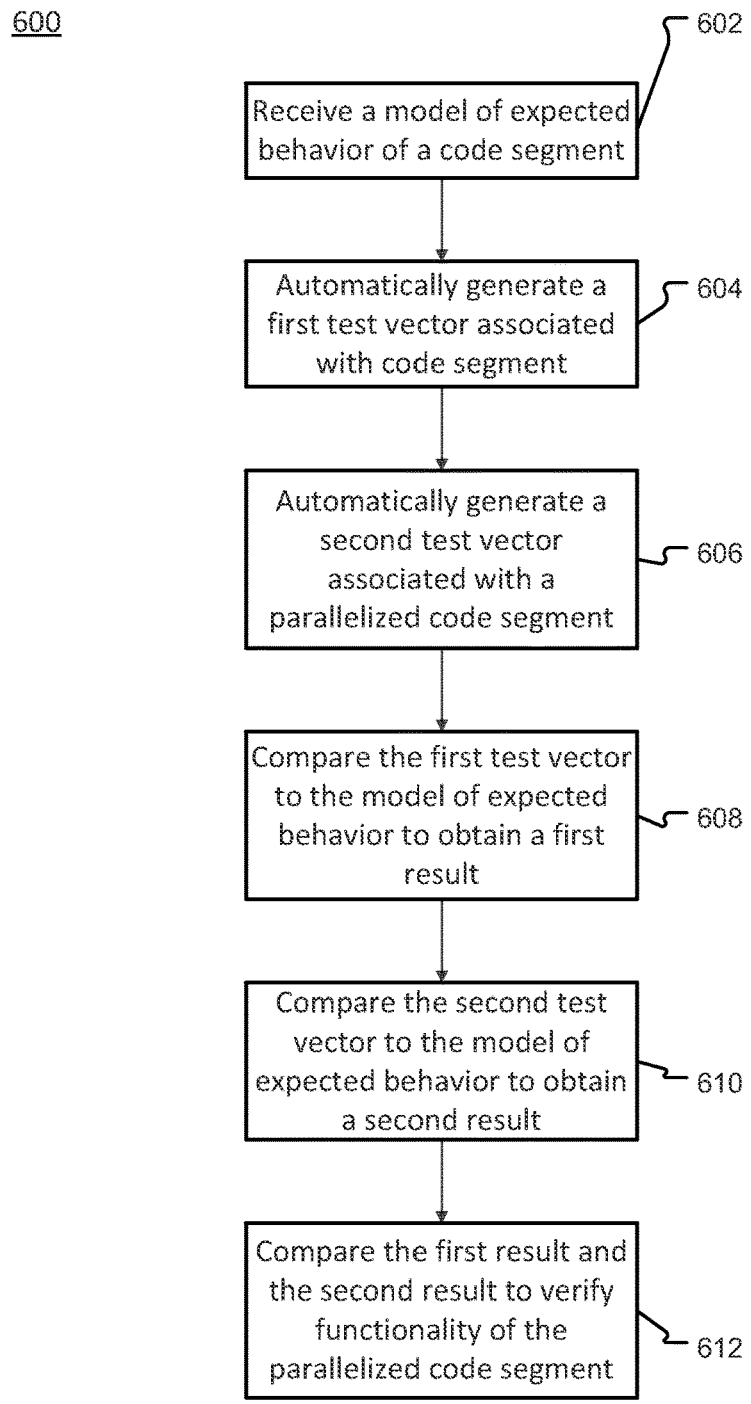
FIG. 6 is a flow diagram illustrating operations for verifying the functionality of a parallelized code segment according to a second embodiment of the present disclosure.

FIG. 6 illustrates a method 600 for verifying the functionality of a parallelized code segment according to one or more embodiments of the present disclosure. In one embodiment, the method 600 begins at operation 602 in which a model of expected behavior of a code segment is received by the verification agent. For example, the model of expected behavior may be provided to the verification agent by a programmer, administrator or other such user. The model of expected behavior may include all observed input/output sets for the code segment being verified during its execution over several thousand invocations.

After operation 602, flow proceeds to operation 604 where a first test vector associated with the code segment is automatically generated during execution of the code segment. For example, the first test vector may be created by the verification agent for the code segment. The first test vector may include the inputs to the code segment being verified and the code segment return type.

After operation 604, flow proceeds to operation 606 where a second test vector associated with a parallelized code segment is automatically generated during execution of the parallelized code segment. In certain embodiments, the second test vector may be created by the verification agent for the parallelized code segment and may include the inputs to the parallelized code segment and the parallelized code segment return type. The parallelized code segment may be derived from the code segment. For example, the parallelized code segment may be derived from the code segment when the code segment is determined to be parallelizable and when it is determined to parallelize the parallelizable code segment, as discussed above in relation to FIG. 3.

After the second test vector is automatically generated during execution of the parallelized code segment, flow proceeds to operation 608 where the first test vector is compared to the model of expected behavior to obtain a first result. For example, the verification agent may compute an input hash value of the first test vector inputs and an output hash value of the first test vector output and compare the input hash value with the model of expected behavior to find a match between the input hash value and observed input sets of the model of expected behavior. The verification agent may then compare the output hash with the model of expected behavior to obtain a first result.

After the first test vector is compared to the model of expected behavior to obtain a first result, flow proceeds to operation 610 where the second test vector is compared to the model of expected behavior to obtain a second result. For example, the verification agent may compute an input hash value of the second test vector inputs and an output hash value of the second test vector output and compare the input hash value with the model of expected behavior to find a match between the input hash value and observed input sets of the model of expected behavior. The verification agent may then compare the output hash with the model of expected behavior to obtain a second result. Flow then proceeds to operation 612 where the first result and second result are compared to verify functionality of the parallelized code segment.

Figure 7:
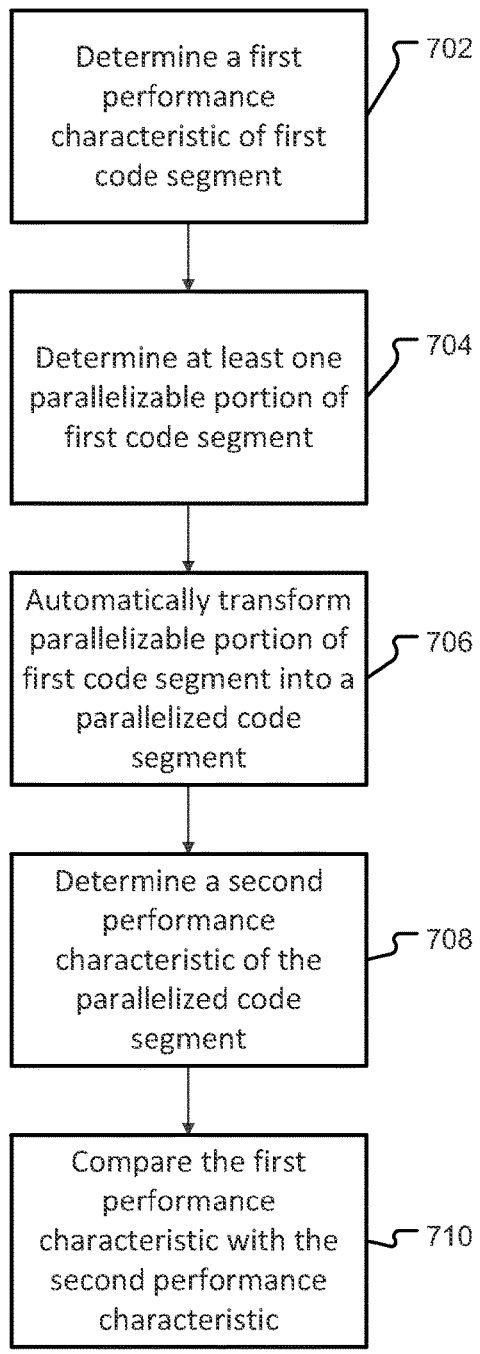
FIG. 7 is a flow diagram illustrating operations for comparing pre-transformation and post-transformation performance profiles to determine whether a code segment should be parallelized according to an embodiment of the present disclosure.

FIG. 7 illustrates a method for comparing pre-transformation and post-transformation performance profiles to determine whether a code segment should be parallelized according to one or more embodiments of the present disclosure. In one embodiment, the method 700 begins at operation 702 in which a first performance characteristic of a first code segment is determined during execution of the first code segment. For example, while the first code segment is being executed, the profiling agent may transform the first code segment to track how long it takes to execute, i.e., what the processor time is to execute the first code segment. In this regard, the first performance characteristic may include the processor time for executing the first code segment. The processor time for executing the first code segment may be based on the number of times the code segment is executed and/or the type of structure of the code segment, for example.

After a first performance characteristic of the first code segment is determined, flow proceeds to operation 704 where at least one parallelizable portion of the first code segment is determined based on the first performance characteristic. For example, the parallelization agent may analyze a read-modify-write sequence of instructions for a local variable of a portion of the code segment (e.g., sequential loop iterations such as for( ), while( ) and do while( ) loops) and determine whether the sequence contains a modification operation that is reducible. If the modification operation is reducible, the code segment may include a parallelizable structure. The parallelization agent may analyze the first performance characteristic of the first code segment and compare it against the portion of the first code segment determined to be parallelizable to determine whether it is beneficial to parallelize the parallelizable portion of the code segment based on first performance characteristic, e.g., how much processor time the parallelizable portion of the code segment took to execute.

Flow then proceeds to operation 706 after at least one parallelizable portion of the first code segment is determined Operation 706 includes automatically transforming the parallelizable portion of the first code segment into a parallelized code segment. Automatically parallelizing the parallelizable portion of the code segment may include modifying the original code segment to be parallelized/transformed and creating a new parallelized code segment. The new parallelized code segment may contain the functionality of the original code segment's sequential loop iterations.

Next, flow proceeds to operation 708 where a second performance characteristic is determined during execution of the parallelized code segment. For example, while the parallelized code segment is being executed, the profiling agent may transform the parallelized code segment to track how long it takes to execute, i.e., what the processor time is to execute the parallelized code segment. In this regard, the second performance characteristic may include the processor time for executing the parallelized code segment.

Flow then proceeds to operation 710 where the first performance characteristic is compared with the second performance characteristic. For example, the processor time to execute the first code segment may be compared with the processor time to execute the parallelized code segment to determine whether a speedup was achieved by transforming/parallelizing the first code segment.

Figure 8:
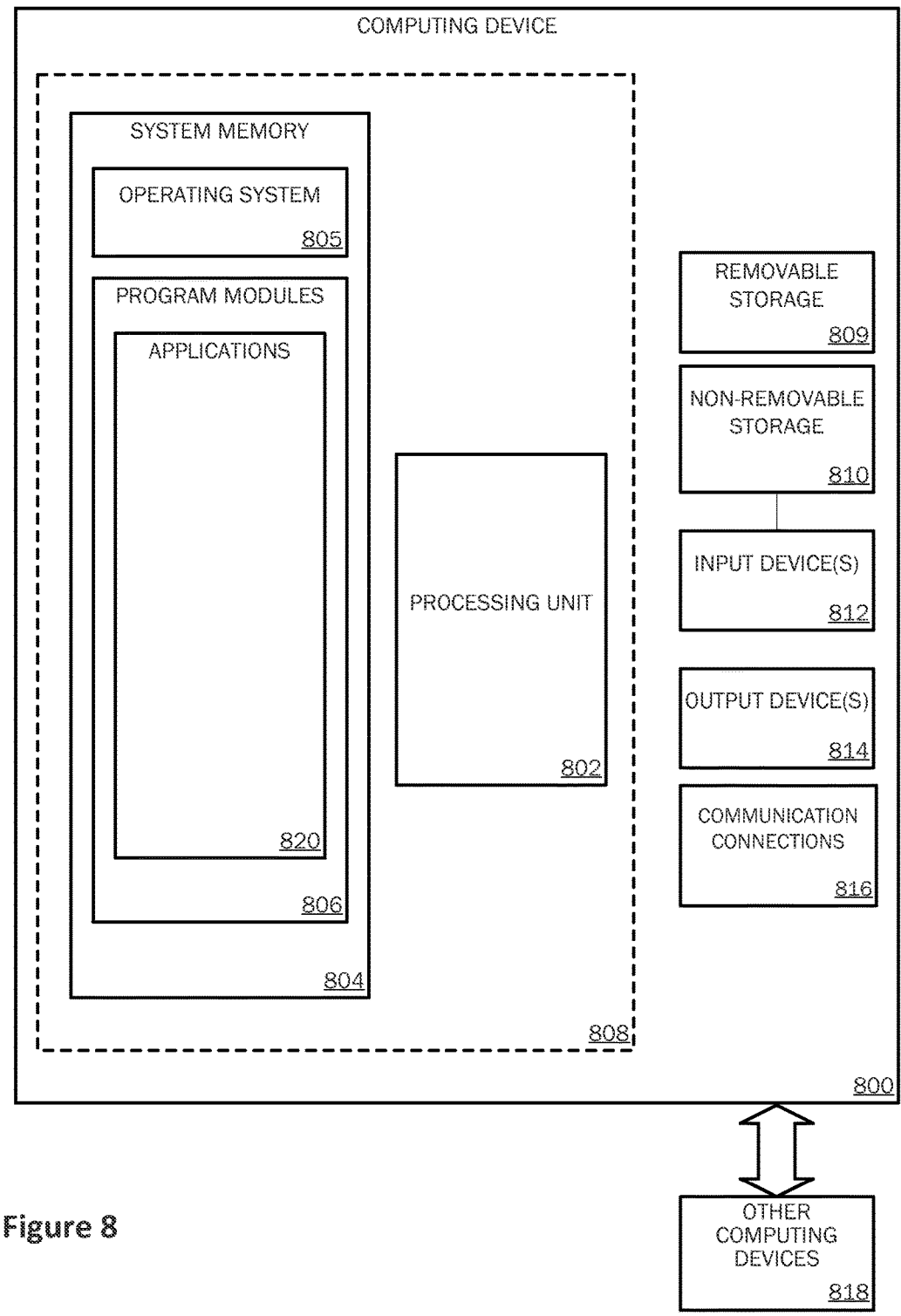
FIG. 8 is a flow diagram illustrating operations for comparing pre-transformation and post-transformation performance profiles to determine whether a code segment should be parallelized according to an embodiment of the present disclosure.
Figure 9:
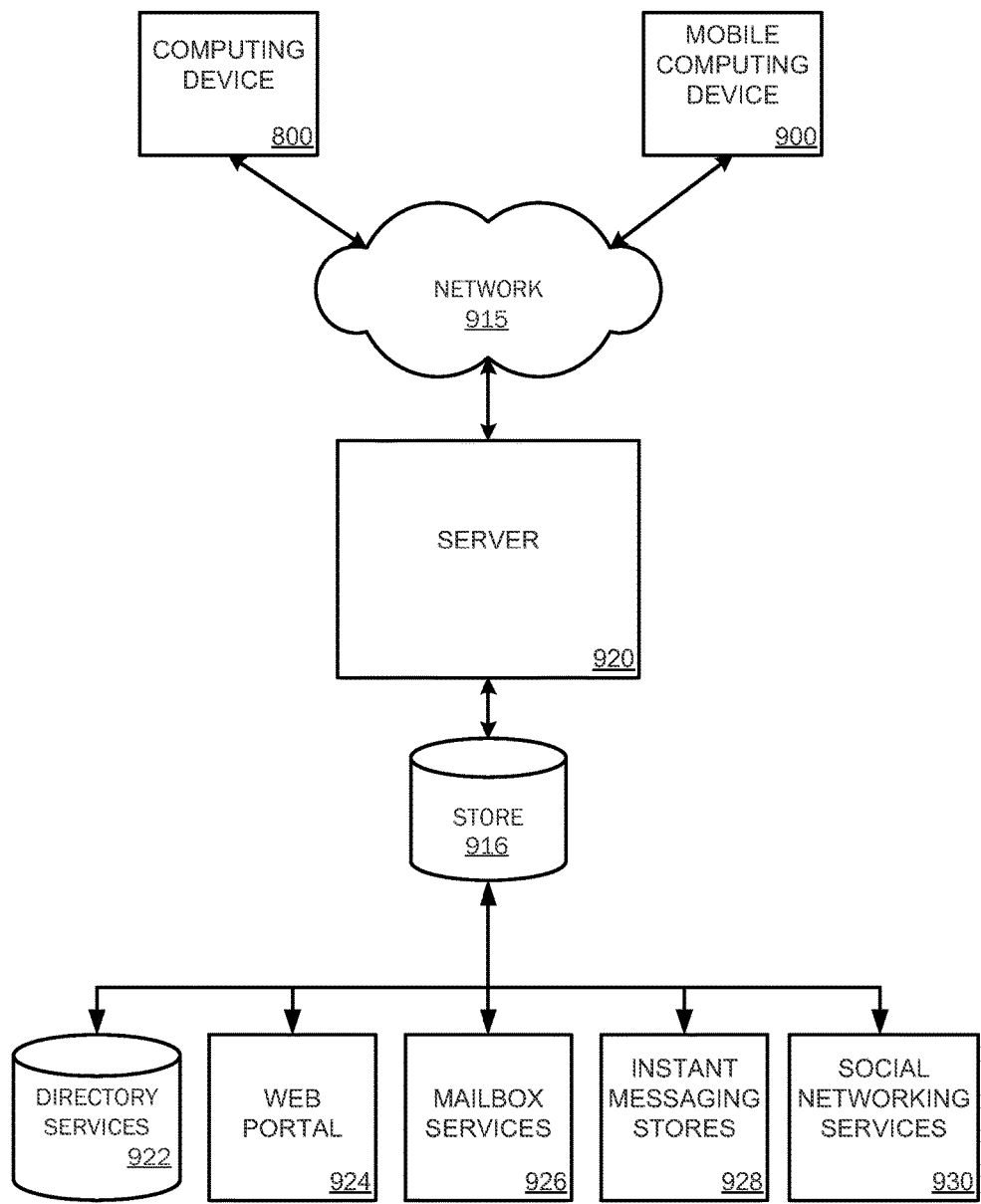
FIG. 9 is a block diagram illustrating a system for transferring data between different computing devices according to an embodiment of the present disclosure.

FIGS. 8-9 and the associated descriptions provide a discussion of a variety of operating environments in which embodiments of the present disclosure may be practiced. However, the devices and systems illustrated and discussed with respect to FIGS. 8-9 are for purposes of example and illustration and are not limiting of a vast number of computing device configurations that may be utilized for practicing embodiments described herein.

FIG. 8 is a block diagram illustrating physical components (i.e., hardware) of a computing device 800 with which embodiments of the present disclosure may be practiced. The computing device components described below may be suitable for the computing environments 100 and 200 described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running software applications 820 or other code that is to be analyzed for parallelization purposes. The operating system 805, for example, may be suitable for controlling the operation of the computing device 800. Furthermore, embodiments of the present disclosure may be practiced in conjunction with other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes including, but not limited to, one or more of the stages of the methods described above in conjunction with FIGS. 3-7. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 800 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include, but are not limited to, RF transmitter, receiver, and/or transceiver circuitry, universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 9 illustrates one embodiment of the architecture of a system for transferring data between different computing devices including computing device 800 and mobile computing device 900. Data may be transferred between a client computing device and another computing device, such as, for example, a server computing device. Additionally, the data may be stored in different communication channels or other storage types. For example, various documents, test cases, parallelized code and the like, may be stored using a directory service 922, a web portal 924, a mailbox service 926, an instant messaging store 928, or a social networking site 930. A server 920 may provide data to and from client computing device 800. As one example, the server 920 may be a web server. The server 920 may provide data to a computing device 800 or the mobile computing device 900 over the web through a network 915. By way of example, each of the operating environments described above with respect to FIGS. 1 and 2 may be embodied in a personal computer, a tablet computing device and/or a mobile computing device 600 (e.g., a smart phone). Any of these embodiments may obtain content from the store 916.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Additionally, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

We claim:

1. A method for parallelizing a deployed code segment during a runtime execution of the code segment on a target device, the method comprising:
    generating, during the execution of the code segment, a profile of the code segment;
    analyzing, on the target device during the execution of the code segment, the code segment to determine whether a parallelizable portion is present in the code segment;
    in response to determining whether a parallelizable portion is present in the code segment, dynamically determining, during the execution of the code segment, resource availability on the target device;
    determining, during the execution of the code segment, whether to parallelize the parallelizable portion of the code segment based on the profile of the code segment and the resource availability on the target device; and
    when it is determined that the parallelizable portion is to be parallelized, modifying, during the execution of the code segment, the code segment by automatically parallelizing the parallelizable portion of the code segment on the target device.

2. The method of claim 1, wherein the code segment is a binary code segment.

3. The method of claim 1, wherein the code segment is an object code segment.

4. The method of claim 1, wherein the code segment is a class in a code base.

5. The method of claim 1, wherein the parallelizable portion of the code segment comprises at least one parallel structure.

6. The method of claim 1, wherein the analyzing operation comprises analyzing a processor time required to execute the code segment.

7. A method for parallelizing a code segment during an execution of a code segment, the method comprising:
    determining, during the execution of the code segment, a first performance characteristic of the code segment;
    determining, during the execution of the code segment, at least one parallelizable portion of the code segment based on the first performance characteristic;
    in response to determining the at least one parallelizable portion of the code segment, dynamically determining, during the execution of the code segment, resource availability in a runtime environment;
    based on the resource availability, modifying, during the execution of the code segment, the parallelizable portion of the code segment into a parallelized code segment;
    determining, during execution of the parallelized code segment, a second performance characteristic of the parallelized code segment; and
    comparing the first performance characteristic with the second performance characteristic.

8. The method of claim 7, wherein the first performance characteristic comprises the processor time for executing the first code segment.

9. The method of claim 8, wherein the processor time for executing the first code segment is based on the number of times the first code segment is executed.

10. The method of claim 8, wherein the processor time for executing the first code segment is based on the type of structure of the first code segment.

11. The method of claim 7, wherein the second performance characteristic comprises the processor time for executing the parallelized code segment.

12. The method of claim 11, wherein the processor time for executing the parallelized code segment is based on the number of times the parallelizable portion of the first code segment is executed.

13. A method for verifying functionality of a parallelized code segment, the method comprising:
    receiving a model of expected behavior of a deployed code segment, wherein the deployed code segment is parallelized during an execution of the deployed code segment based at least on a determination of resource availability in an execution environment of the deployed code segment, and wherein the deployed code segment is modified during the execution of the deployed code segment by automatically parallelizing a parallelizable portion of the deployed code segment;
    automatically generating a first test vector associated with the deployed code segment during the execution of the deployed code segment;

automatically generating a second test vector associated with the parallelized code segment during the execution of the parallelized code segment;

comparing the first test vector to the model of expected behavior to obtain a first result;

comparing the second test vector to the model of expected behavior to obtain a second result; and comparing the first result and the second result to verify functionality of the parallelized code segment.

14. The method of claim 13, wherein the model of expected behavior comprises observed input/output sets for the code segment.

15. The method of claim 13, wherein the first test vector comprises inputs to the code segment and a compiled code segment return type.

16. The method of claim 13, wherein the second test vector comprises inputs to the parallelized code segment and a parallelized code segment return type.

17. The method of claim 15, further comprising:

computing an input hash value of the inputs to the code segment and an output hash value of the compiled code segment return type; and comparing the input hash value with the model of expected behavior.

18. A system comprising:

a processor; and a memory, the memory for storing instructions which, when executed by the processor, performs a method, the method for parallelizing a deployed code segment during a runtime execution of the code segment on a target device, the method comprising:

generating, during the execution of the code segment, a profile of the code segment;

analyzing, on the target device during the execution of the code segment, the code segment to determine whether a parallelizable portion is present in the code segment;

in response to determining whether a parallelizable portion is present in the code segment, dynamically determining, during the execution of the code segment, resource availability on the target device;

determining, during the execution of the code segment, whether to parallelize the parallelizable portion of the code segment based on the profile of the code segment and the resource availability of the target device; and when it is determined that the parallelizable portion is to be parallelized, modifying, during the execution of the code segment, the code segment by automatically parallelizing the parallelizable portion of the code segment on the target device.

19. A system comprising:

a processor; and a memory, the memory for storing instructions which, when executed by the processor, performs a method for parallelizing a code segment during a runtime execution of a code segment, the method comprising:

determining, during the runtime execution, a first performance characteristic of the code segment;

determining, during the runtime execution, at least one parallelizable portion of the code segment based on the first performance characteristic;

in response to determining the at least one parallelizable portion of the code segment, dynamically determining, during the runtime execution, resource availability in a runtime environment;

based on the resource availability, modifying, during the execution of the code segment, the parallelizable portion of the code segment into a parallelized code segment;

determining, during execution of the parallelized code segment, a second performance characteristic of the parallelized code segment; and comparing the first performance characteristic with the second performance characteristic.

20. A system comprising:

a processor; and a memory, the memory for storing instructions which, when executed by the processor, performs a method, the method comprising:

receiving a model of expected behavior of a deployed code segment, wherein the deployed code segment is parallelized during an execution of the deployed code segment based at least on a determination of resource availability in an execution environment of the deployed code segment, and wherein the deployed code segment is modified during the execution of the deployed code segment by automatically parallelizing a parallelizable portion of the deployed code segment;

automatically generating a first test vector associated with the deployed code segment during the execution of the deployed code segment;

automatically generating a second test vector associated with the parallelized code segment during the execution of the parallelized code segment;

comparing the first test vector to the model of expected behavior to obtain a first result;

comparing the second test vector to the model of expected behavior to obtain a second result; and comparing the first result and the second result to verify functionality of the parallelized code segment.

* * * * *